United States Patent
Sun et al.

(10) Patent No.: US 10,439,529 B2
(45) Date of Patent: Oct. 8, 2019

(54) MOTOR COMPONENT, APPLICATION DEVICE AND SENSOR INTEGRATED CIRCUIT

(71) Applicant: Johnson Electric S.A., Murten (CH)

(72) Inventors: Chi Ping Sun, Hong Kong (CN); Fei Xin, Shen Zhen (CN); Ken Wong, Hong Kong (CN); Shing Hin Yeung, Hong Kong (CN); Hui Min Guo, Hong Kong (CN); Shu Zuo Lou, Hong Kong (CN); Xiao Ming Chen, Hong Kong (CN); Guang Jie Cai, Hong Kong (CN); Chun Fai Wong, Hong Kong (CN); Shu Juan Huang, Shen Zhen (CN); Yun Long Jiang, Shen Zhen (CN); Yue Li, Hong Kong (CN); Bao Ting Liu, Shen Zhen (CN); En Hui Wang, Shen Zhen (CN); Xiu Wen Yang, Shen Zhen (CN); Li Sheng Liu, Shen Zhen (CN); Yan Yun Cui, Shen Zhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/231,172

(22) Filed: Aug. 8, 2016

(65) Prior Publication Data
US 2016/0359439 A1    Dec. 8, 2016

Related U.S. Application Data

(63) Continuation-in-part of application No. 14/822,353, filed on Aug. 10, 2015, now Pat. No. 9,755,555, (Continued)

(30) Foreign Application Priority Data

Aug. 8, 2014  (CN) .......................... 2014 1 0390592
Aug. 15, 2014 (CN) .......................... 2014 1 0404474
(Continued)

(51) Int. Cl.
*H02P 1/00* (2006.01)
*H02P 27/04* (2016.01)
(Continued)

(52) U.S. Cl.
CPC .............. *H02P 6/20* (2013.01); *G01D 5/142* (2013.01); *H02K 11/044* (2013.01); *H02K 11/20* (2016.01);
(Continued)

(58) Field of Classification Search
CPC ............... H02P 1/00; H02P 27/04; H02P 6/20
(Continued)

(56) References Cited

U.S. PATENT DOCUMENTS 5,675,226 A    10/1997  Riola'
6,097,127 A *  8/2000  Rivera ................ H02K 3/28
                                                  310/184
(Continued)

FOREIGN PATENT DOCUMENTS

CN    201409107 Y    2/2010
CN    201590796 U    9/2010
(Continued)

*Primary Examiner* — Bickey Dhakal
*Assistant Examiner* — Cortez M Cook
(74) *Attorney, Agent, or Firm* — Muncy, Geissler, Olds & Lowe, P.C.

(57) ABSTRACT

A sensor integrated circuit includes a rectifier, a power supply module, an output control circuit and a detecting circuit. The rectifier is configured to convert an external power supply into a first direct current power supply. The
(Continued)

power supply module includes a voltage regulator configured to generate a second direct current power supply different from the first direct current power supply. The detecting circuit is powered by the second direct current power supply and configured to detect an inputted signal and correspondingly generate a control signal. The output control circuit is configured to control, in response to at least the control signal, the sensor integrated circuit to operate in at least one of a first state in which a current flows out from an output port and a second state in which a current flows in from the output port.

16 Claims, 11 Drawing Sheets

Related U.S. Application Data which is a continuation-in-part of application No. PCT/CN2015/086422, filed on Aug. 7, 2015.

(30) Foreign Application Priority Data

Apr. 26, 2016 (CN) .......................... 2016 1 0266465
Jun. 2, 2016 (CN) .......................... 2016 1 0392171

(51) Int. Cl.
| | | |
|---|---|---|
| *H02P 6/20* | (2016.01) | |
| *H02P 7/295* | (2016.01) | |
| *H02P 6/16* | (2016.01) | |
| *H02P 6/30* | (2016.01) | |
| *H02P 7/03* | (2016.01) | |
| *G01D 5/14* | (2006.01) | |
| *H02K 11/20* | (2016.01) | |
| *H02K 11/33* | (2016.01) | |
| *H02K 11/04* | (2016.01) | |

(52) U.S. Cl.
CPC ................ *H02K 11/33* (2016.01); *H02P 6/16* (2013.01); *H02P 6/30* (2016.02); *H02P 7/05* (2016.02); *H02P 7/295* (2013.01); *H02P 2207/05* (2013.01); *Y02P 80/116* (2015.11)

(58) Field of Classification Search
USPC ...................... 318/400.21, 280, 800, 400.26
See application file for complete search history.

(56) References Cited

U.S. PATENT DOCUMENTS

| | | | | |
|---|---|---|---|---|
| 7,173,388 | B1* | 2/2007 | Hsu ....................... | H02P 29/032 |
| | | | | 318/400.21 |
| 2006/0087277 | A1* | 4/2006 | Norell ..................... | H02P 1/163 |
| | | | | 318/701 |
| 2007/0103103 | A1* | 5/2007 | Maue ....................... | H02P 6/16 |
| | | | | 318/280 |
| 2008/0024940 | A1* | 1/2008 | Plunkett ................. | H02H 7/093 |
| | | | | 361/25 |
| 2012/0086382 | A1* | 4/2012 | Peto ..................... | H02M 1/4225 |
| | | | | 318/729 |
| 2016/0028334 | A1* | 1/2016 | Greetham ............... | H02P 27/16 |
| | | | | 318/400.27 |

FOREIGN PATENT DOCUMENTS

| | | | |
|---|---|---|---|
| CN | 102075130 A | 5/2011 | |
| DE | 102006055482 A1 | 6/2008 | |
| WO | WO 2014135903 A2 * | 9/2014 | ............. H02P 27/16 |
| WO | WO-2014135903 A2 * | 9/2014 | ............. H02P 27/16 |

* cited by examiner

MOTOR COMPONENT, APPLICATION DEVICE AND SENSOR INTEGRATED CIRCUIT

CROSS REFERENCE TO RELATED APPLICATIONS

This non-provisional patent application is a continuation-in-part of U.S. patent application Ser. No. 14/822,353, which claims priority to Chinese Patent Application No. 201410390592.2, filed on Aug. 8, 2014 and to Chinese Patent Application No. 201410404474.2, filed on Aug. 15, 2014. In addition, this non-provisional patent application claims priority under the Paris Convention to PCT Patent Application No. PCT/CN2015/086422, filed with the Chinese Patent Office on Aug. 7, 2015, to Chinese Patent Application No. CN201610266465.0, filed with the Chinese Patent Office on Apr. 26, 2016, and to Chinese Patent Application No. CN201610392171.2, filed with the Chinese Patent Office on Jun. 2, 2016, all of which are incorporated herein by reference in their entirety.

FIELD

The present disclosure relates to the technical field of electronic circuit, and in particular to a sensor integrated circuit.

BACKGROUND

During starting of a synchronous motor, the stator produces an alternating magnetic field causing the permanent magnetic rotor to be oscillated. The amplitude of the oscillation of the rotor increases until the rotor begins to rotate, and finally the rotor is accelerated to rotate in synchronism with the alternating magnetic field of the stator. To ensure the starting of a conventional synchronous motor, a starting point of the motor is set to be low, which results in that the motor cannot operate at a relatively high working point, thus the efficiency is low. In another aspect, the rotor cannot be ensured to rotate in a same direction every time since a stop or stationary position of the permanent magnetic rotor is not fixed. Accordingly, in applications such as a fan and water pump, the impeller driven by the rotor has straight radial vanes, which results in a low operational efficiency of the fan and water pump.

FIG. 1 illustrates a conventional drive circuit for a synchronous motor, which allows a rotor to rotate in a same predetermined direction in every time it starts. In the circuit, a stator winding 1 of the motor is connected in series with a TRIAC between two terminals M and N of an AC power source VM, and an AC power source VM is converted by a conversion circuit DC into a direct current voltage and the direct current is supplied to a position sensor H. A magnetic pole position of a rotor in the motor is detected by the position sensor H, and an output signal Vh of the position sensor H is connected to a switch control circuit PC to control the bidirectional thyristor T.

FIG. 2 illustrates a waveform of the drive circuit. It can be seen from FIG. 2 that, in the drive circuit, no matter the bidirectional thyristor T is switched on or off, the AC power source supplies power for the conversion circuit DC so that the conversion circuit DC constantly outputs and supplies power for the position sensor H (referring to a signal VH in FIG. 2). In a low-power application, in a case that the AC power source is commercial electricity of about 200V, the electric energy consumed by two resistors R2 and R3 in the conversion circuit DC is more than the electric energy consumed by the motor.

The magnetic sensor applies Hall effect, in which, when current I runs through a substance and a magnetic field B is applied in a positive angle with respect to the current I, a potential difference V is generated in a direction perpendicular to the direction of current I and the direction of the magnetic field B. The magnetic sensor is often implemented to detect the magnetic polarity of an electric rotor.

As the circuit design and signal processing technology advances, there is a need to improve the magnetic sensor integrated circuit for the ease of use and accurate detection.

SUMMARY

A sensor integrated circuit is provided according to an aspect of the present disclosure, which includes: a housing, a semiconductor substrate arranged inside the housing, an output port extending out from the housing, input ports configured to connect an external power supply, and an electronic circuitry arranged on the semiconductor substrate, where the electronic circuitry includes a rectifier, a power supply module, an output control circuit and a detecting circuit, where
- the rectifier is configured to convert the external power supply into a first direct current power supply;
- the power supply module includes a voltage regulator configured to generate a second direct current power supply different from the first direct current power supply;
- the detecting circuit is powered by the second direct current power supply and is configured to detect a signal inputted to the sensor integrated circuit and correspondingly generate a control signal; and
- the output control circuit is configured to control, in response to at least the control signal, the sensor integrated circuit to operate in at least one of a first state in which a current flows from the output port to an outside of the sensor integrated circuit and a second state in which a current flows from the outside of the sensor integrated circuit to the output port.

Preferably, the detecting circuit may include a magnetic sensor configured to detect an external magnetic field and output a magnetic field detection signal matching with the external magnetic field, and the magnetic field detection signal may serve as the control signal.

Preferably, a voltage supplied to the output control circuit may be different from a voltage of the second direct current power supply.

Preferably, the output control circuit may be powered by the first direct current power supply, and an average value of the voltage supplied to the output control circuit may be higher than an average value of the output voltage of the second direct current power supply.

Preferably, the power supply module further may include a voltage stabilizer and a band-gap reference voltage source, where
- the voltage stabilizer may be configured to stabilize a voltage of the first direct current power supply to a lower voltage serving as a third direct current power supply;
- the band-gap reference voltage source may be powered by the third direct current power supply and may be configured to generate a reference voltage lower than the voltage of the third direct current power supply; and the voltage regulator may be powered by the first direct current power supply and may be configured to generate the second direct current power supply based on the reference voltage.

Preferably, a voltage of the second direct current power supply may be lower than the voltage of the third direct current power supply.

Preferably, the output control circuit may include a first switch and a second switch, the first switch and the output port may be connected in a first current path, the second switch and the output port may be connected in a second current path having a direction opposite to a direction of the first current path, and the first switch and the second switch may be turned on selectively under the control of the magnetic field detection signal.

Preferably, the output control circuit may include a first current path in which a current flows from the output port to the outside of the sensor integrated circuit, a second current path in which a current flows from the output port to an inside of the sensor integrated circuit, and a switch connected in one of the first current path and the second current path; and the switch may be controlled based on magnetic field detection information outputted by the detecting circuit to cause the first current path and the second current path to be turned on selectively.

Preferably, the other one of the first current path and the second current path may do not include a switch.

Preferably, the magnetic sensor may include:
a magnetic sensing element, configured to sense polarity of the external magnetic field and output an electric signal;
a signal processing unit, configured to amplify and descramble the electric signal to generate an analog electric signal; and
an analog-digital converting unit, configured to convert the analog electric signal into a logic high level signal or a logic low level signal; and
the power supply module may further include a reference signal generator configured to generate another reference voltage based on the reference voltage output from the band-gap reference voltage source and provide said another reference voltage to the analog-digital converting unit.

Preferably, the magnetic sensing element may be powered by the second direct current power supply.

Preferably, the external power supply may be an alternate current power supply, and the output control circuit may be configured to control, based on information on the alternate current power supply and the magnetic field detection signal, the sensor integrated circuit to switch at least between the first state in which a current flows from the output port to the outside of the sensor integrated circuit and the second state in which a current flows from the outside of the sensor integrated circuit to the output port.

Preferably, the external power supply may be an alternate current power supply, and the output control circuit may be configured to control the sensor integrated circuit to: operate in one of the first state and the second state in a case that the magnetic field detection signal indicates that the external magnetic field is in first magnetic polarity and the alternate current power supply is in first electric polarity; and operate in the other one of the first state and the second state in a case that the magnetic field detection signal indicates that the external magnetic field is in second magnetic polarity opposite to the first magnetic polarity and the alternate current power supply is in second electric polarity opposite to the first electric polarity.

Preferably, the external power supply may be an alternate current power supply, and the output control circuit may be configured to: cause a load current flowing through the output port in a case that the alternate current power supply is in a positive half-period and the external magnetic field is in first magnetic polarity or in a case that the alternate current power supply is in a negative half-period and the external magnetic field is in second magnetic polarity opposite to the first magnetic polarity; and cause no load current flowing through the output port in a case that the alternate current power supply is in a negative half-period and the external magnetic field is in the first magnetic polarity or in a case that the alternate current power supply is in a positive half-period and the external magnetic field is in the second magnetic polarity.

A motor component is provided according to another aspect of the present disclosure, which includes a motor and a motor driving circuit, where the motor driving circuit includes the above sensor integrated circuit.

Preferably, the motor driving circuit may further include a bidirectional switch connected in series to the motor across an external alternate current power supply. The output port of the sensor integrated circuit may be connected to a control terminal of the bidirectional switch.

Preferably, the motor may include a stator and a permanent magnet rotor, and the stator may include a stator core and a single-phase winding wound on the stator core.

An application device of a motor component is provided according to another aspect of the present disclosure, where the motor component includes a motor and a motor driving circuit, and the motor driving circuit includes the above sensor integrated circuit.

Preferably, the application device may include a pump, a fan, a household electric appliance, and a vehicle.

The present disclosure is provided to extend functions of an existing sensor integrated circuit, which can reduce the circuit cost and improve the circuit reliability.

BRIEF DESCRIPTION OF THE DRAWINGS

The accompanying drawings needed to be used in the description of the embodiments or the conventional technology are described briefly as follows, so that the technical solutions according to the embodiments of the present disclosure or according to the conventional technology become clearer. It is apparent that the accompanying drawings in the following description show only some embodiments of the present disclosure. For those skilled in the art, other accompanying drawings may be obtained according to these accompanying drawings without any creative work.

DETAILED DESCRIPTION

Technical solutions according to embodiments of the present disclosure are described clearly and completely in conjunction with the drawings in the embodiments of the present disclosure hereinafter. Apparently, the described embodiments are only a few rather than all of the embodiments of the present disclosure. Other embodiments obtained by those skilled in the art without any creative work based on the embodiments of the present disclosure fall into the scope of protection of the present disclosure.

More specific details are set forth in the following descriptions for sufficient understanding of the disclosure, but the present disclosure may further be implemented by other ways different from the way described herein. Similar extensions can be made by those skilled in the art without departing from the spirit of the present disclosure, and therefore, the present disclosure is not limited to particular embodiments disclosed hereinafter.

Hereinafter, a magnetic sensor integrated circuit according to an embodiment of the present disclosure is explained by taking the magnetic sensor integrated circuit being applied in a motor as an example.

Figure 1:
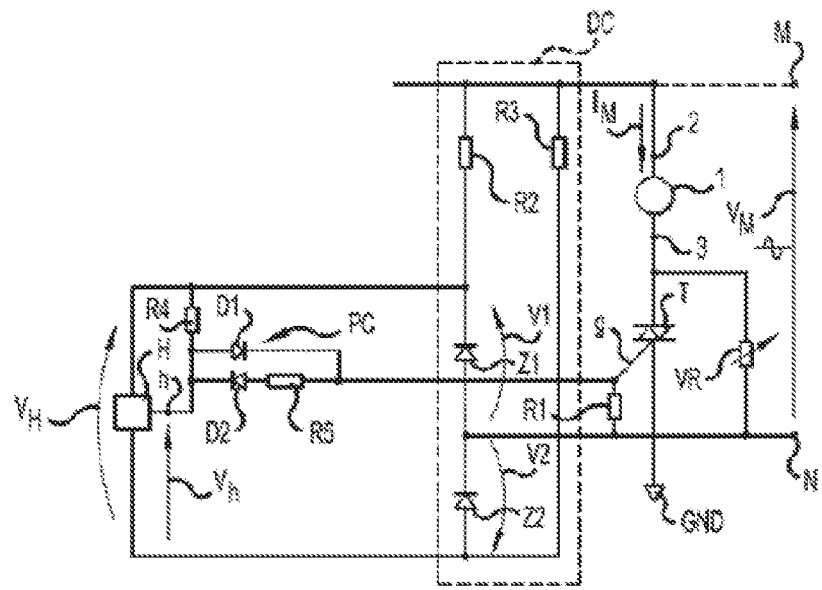
FIG. 1 illustrates a prior art drive circuit for a synchronous motor, according to an embodiment of the present disclosure.
Figure 2:
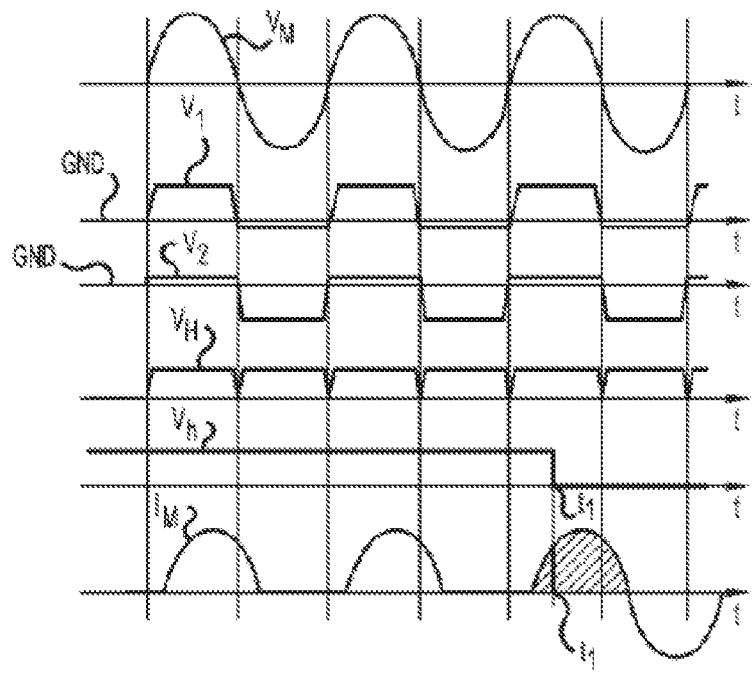
FIG. 2 illustrates a waveform of the drive circuit shown in FIG. 1.
Figure 3:
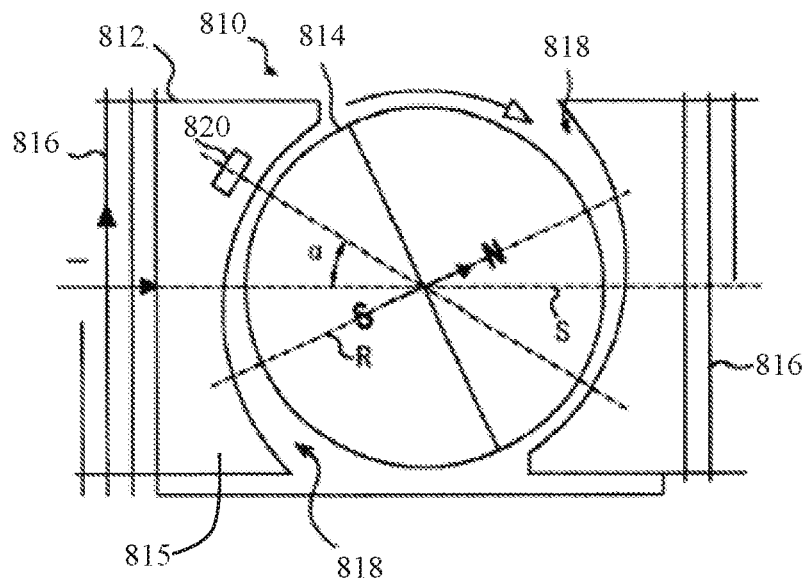
FIG. 3 illustrates a diagrammatic representation of a synchronous motor, according to an embodiment of the present disclosure.

FIG. 3 schematically shows a synchronous motor according to an embodiment of the present invention. The synchronous motor 810 includes a stator 812 and a permanent magnet rotor 814 rotatably disposed between magnetic poles of the stator 812, and the stator 812 includes a stator core 815 and a stator winding 816 wound on the stator core 815. The rotor 814 includes at least one permanent magnet forming at least one pair of permanent magnetic poles with opposite polarities, and the rotor 814 operates at a constant rotational speed of 60 f/p rpm during a steady state phase in a case that the stator winding 816 is connected to an AC power supply, where f is a frequency of the AC power supply and p is the number of pole pairs of the rotor.

Non-uniform gap 818 is formed between the magnetic poles of the stator 812 and the permanent magnetic poles of the rotor 814 so that a polar axis R of the rotor 814 has an angular offset α relative to a central axis S of the stator 812 in a case that the rotor is at rest. The rotor 814 may be configured to have a fixed starting direction (a clockwise direction in this embodiment as shown by the arrow in FIG. 3) every time the stator winding 816 is energized. The stator and the rotor each have two magnetic poles as shown in FIG. 3. It can be understood that, in other embodiments, the stator and the rotor may also have more magnetic poles, such as 4 or 6 magnetic poles.

A position sensor 820 for detecting the angular position of the rotor is disposed on the stator 812 or at a position near the rotor inside the stator, and the position sensor 820 has an angular offset relative to the central axis S of the stator. Preferably, this angular offset is also α, as in this embodiment. Preferably, the position sensor 820 is a Hall effect sensor.

Figure 4:
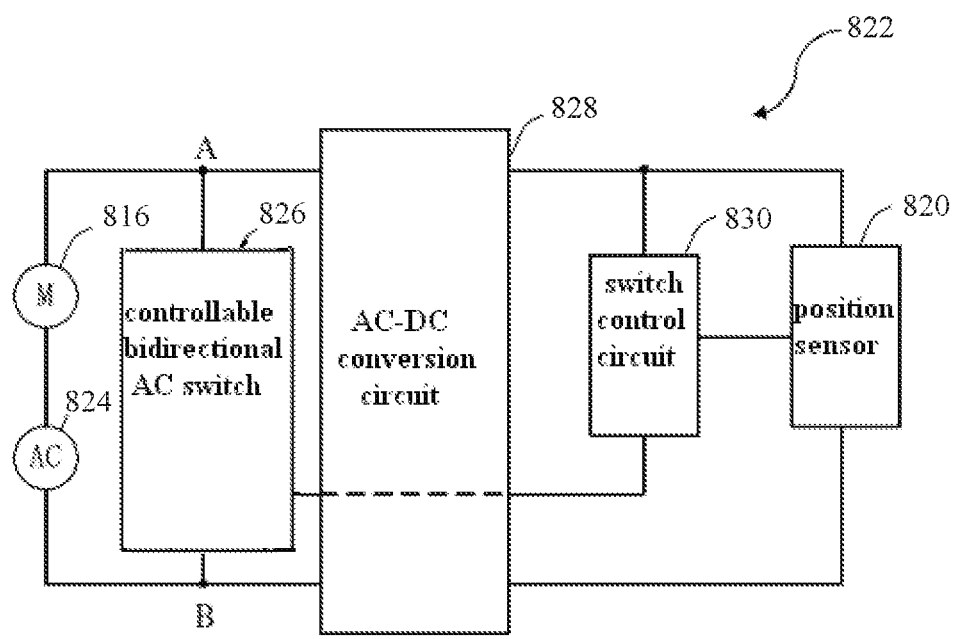
FIG. 4 illustrates a block diagram of a drive circuit for a synchronous motor, according to an embodiment of the present disclosure.

FIG. 4 shows a block diagram of a drive circuit for a synchronous motor according to an embodiment of the present invention. In the drive circuit 822, the stator winding 816 and the AC power supply 824 are connected in series between two nodes A and B. Preferably, the AC power supply 824 may be a commercial AC power supply with a fixed frequency, such as 50 Hz or 60 Hz, and a supply voltage may be, for example, 110V, 220V or 230V. A controllable bidirectional AC switch 826 is connected between the two nodes A and B, in parallel with the stator winding 816 and the AC power supply 824. Preferably, the controllable bidirectional AC switch 826 is a TRIAC, of which two anodes are connected to the two nodes A and B respectively. It can be understood that, the controllable bidirectional AC switch 826 alternatively may be two silicon control rectifiers reversely connected in parallel, and control circuits may be correspondingly configured to control the two silicon control rectifiers in a preset way. An AC-DC conversion circuit 828 is also connected between the two nodes A and B. An AC voltage between the two nodes A and B is converted by the AC-DC conversion circuit 828 into a low voltage DC. The position sensor 820 may be powered by the low voltage DC output by the AC-DC conversion circuit 828, for detecting the magnetic pole position of the permanent magnet rotor 814 of the synchronous motor 810 and outputting a corresponding signal. A switch control circuit 830 is connected to the AC-DC conversion circuit 828, the position sensor 820 and the controllable bidirectional AC switch 826, and is configured to control the controllable bidirectional AC switch 826 to be switched between a switch-on state and a switch-off state in a predetermined way, based on the magnetic pole position of the permanent magnet rotor which is detected by the position sensor and polarity information of the AC power supply 824 which may be obtained from the AC-DC conversion circuit 828, such that the stator winding 816 urges the rotor 814 to rotate only in the above-mentioned fixed starting direction during a starting phase of the motor. According to this embodiment of the present invention, in a case that the controllable bidirectional AC switch 826 is switched on, the two nodes A and B are shorted, the AC-DC conversion circuit 828 does not consume electric energy since there is no current flowing through the AC-DC conversion circuit 828, hence, the utilization efficiency of electric energy can be improved significantly.

Figure 5:
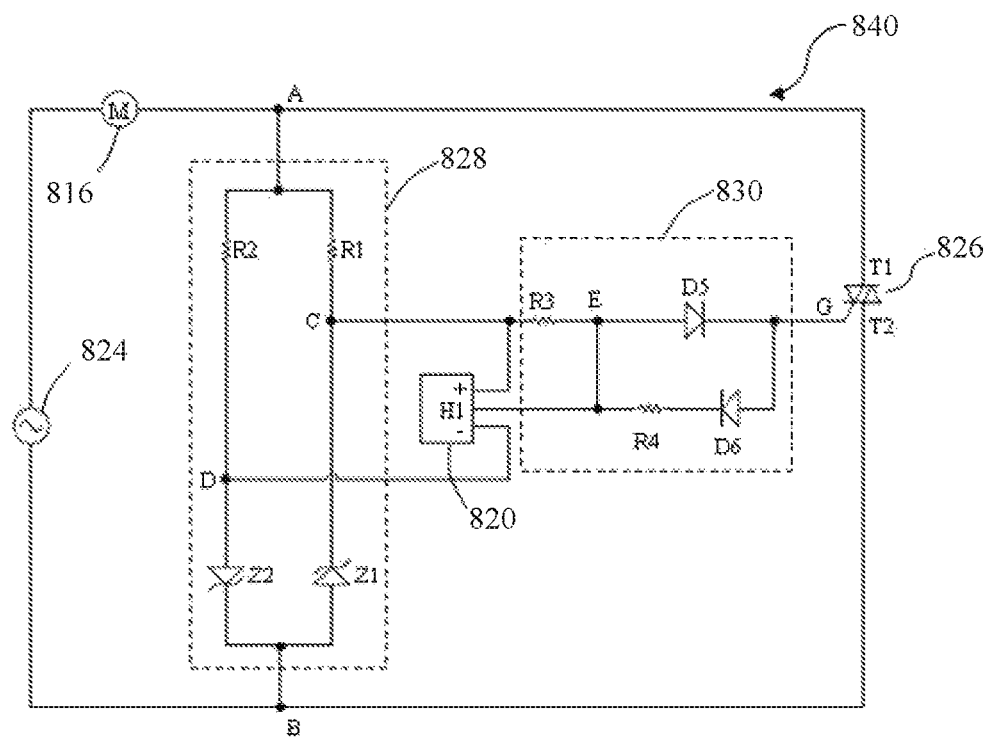
FIG. 5 illustrates a drive circuit for a synchronous motor, according to an embodiment of the present disclosure.

FIG. 5 shows a circuit diagram of a drive circuit 840 for a synchronous motor according to a first embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC (preferably, low voltage ranges from 3V to 18V). The AC-DC conversion circuit 828 includes a first zener diode Z1 and a second zener diode Z2 which are reversely connected in parallel between the two nodes A and B via a first resistor R1 and a second resistor R2 respectively. A high voltage output terminal C of the AC-DC conversion circuit 828 is formed at a connection point of the first resistor R1 and a cathode of the first zener diode Z1, and a low voltage output terminal D of the AC-DC conversion circuit 828 is formed at a connection point of the second resistor R2 and an anode of the second zener diode Z2. The voltage output terminal C is connected to a positive power supply terminal of the position sensor 820, and the voltage output terminal D is connected to a negative power supply terminal of the position sensor 820. Three terminals of the switch control circuit 830 are connected to the high voltage output terminal C of the AC-DC conversion circuit 828, an output terminal H1 of the position sensor 820 and a control electrode G of the TRIAC 826 respectively. The switch control circuit 830 includes a third resistor R3, a fifth diode D5, and a fourth resistor R4 and a sixth diode D6 connected in series between the output terminal HI of the position sensor 820 and the control electrode G of the controllable bidirectional AC switch 826. An anode of the sixth diode D6 is connected to the control electrode G of the controllable bidirectional AC switch 826. One terminal of the third resistor R3 is connected to the high voltage output terminal C of the AC-DC conversion circuit 828, and the other terminal of the third resistor R3 is connected to an anode of the fifth diode D5. A cathode of the fifth diode D5 is connected to the control electrode G of the controllable bidirectional AC switch 826.

Figure 6:
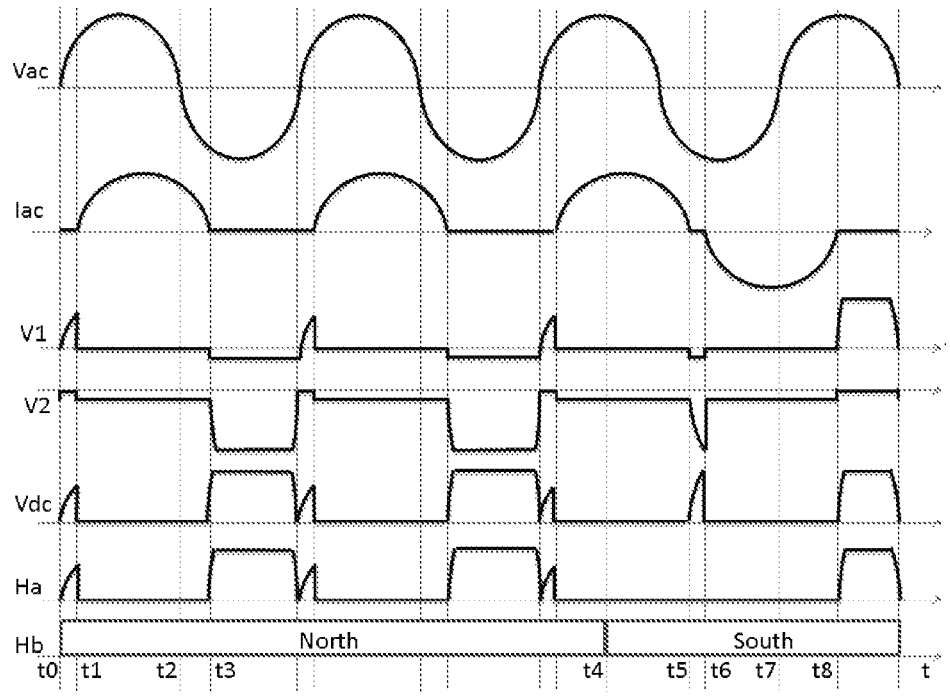
FIG. 6 illustrates a waveform of the drive circuit shown in FIG. 5.

In conjunction with FIG. 6, an operational principle of the drive circuit 840 is described. In FIG. 6, Vac indicates a waveform of voltage of the AC power supply 824, and Iac indicates a waveform of current flowing through the stator winding 816. Due to the inductive character of the stator winding 816, the waveform of current Iac lags behind the waveform of voltage Vac. V1 indicates a waveform of voltage between two terminals of the first zener diode Z1, V2 indicates a waveform of voltage between two terminals of the second zener diode Z2, Vdc indicates a waveform of voltage between two output terminals C and D of the AC-DC conversion circuit 828, Ha indicates a waveform of a signal output by the output terminal H1 of the position sensor 820, and Hb indicates a rotor magnetic field detected by the position sensor 820. In this embodiment, in a case that the position sensor 820 is powered normally, the output terminal HI outputs a logic high level in a case that the detected rotor magnetic field is North, or the output terminal H1 outputs a logic low level in a case that the detected rotor magnetic field is South.

In a case that the rotor magnetic field Hb detected by the position sensor 820 is North, in a first positive half cycle of the AC power supply, the supply voltage is gradually increased from a time instant t0 to a time instant t1, the output terminal H1 of the position sensor 820 outputs a high level, and a current flows through the resistor R1, the resistor R3, the diode D5 and the control electrode G and the second anode T2 of the TRIAC 826 sequentially. The TRIAC 826 is switched on in a case that a drive current flowing through the control electrode G and the second anode T2 is greater than a gate triggering current Ig. Once the TRIAC 826 is switched on, the two nodes A and B are shorted, a current flowing through the stator winding 816 in the motor is gradually increased until a large forward current flows through the stator winding 816 to drive the rotor 814 to rotate clockwise as shown in FIG. 3. Since the two nodes A and B are shorted, there is no current flowing through the AC-DC conversion circuit 28 from the time instant t1 to a time instant t2. Hence, the resistors R1 and R2 do not consume electric energy, and the output of the position sensor 820 is stopped due to no power is supplied. Since the current flowing through two anodes T1 and T2 of the TRIAC 826 is large enough (which is greater than a holding current Ihold), the TRIAC 826 is kept to be switched on in a case that there is no drive current flowing through the control electrode G and the second anode T2. In a negative half cycle of the AC power supply, after a time instant t3, a current flowing through T1 and T2 is less than the holding current Ihold, the TRIAC 826 is switched off, a current begins to flow through the AC-DC conversion circuit 828, and the output terminal HI of the position sensor 820 outputs a high level again. Since a potential at the point C is lower than a potential at the point E, there is no drive current flowing through the control electrode G and the second anode T2 of the TRIAC 826, and the TRIAC 826 is kept to be switched off. Since the resistance of the resistors R1 and R2 in the AC-DC conversion circuit 828 are far greater than the resistance of the stator winding 816 in the motor, a current currently flowing through the stator winding 816 is far less than the current flowing through the stator winding 816 from the time instant t1 to the time instant t2 and generates very small driving force for the rotor 814. Hence, the rotor 814 continues to rotate clockwise due to inertia. In a second positive half cycle of the AC power supply, similar to the first positive half cycle, a current flows through the resistor R1, the resistor R3, the diode D5, and the control electrode G and the second anode T2 of the TRIAC 826 sequentially. The TRIAC 826 is switched on again, and the current flowing through the stator winding 816 continues to drive the rotor 814 to rotate clockwise. Similarly, the resistors R1 and R2 do not consume electric energy since the two nodes A and B are shorted. In the next negative half cycle of the power supply, the current flowing through the two anodes T1 and T2 of the TRIAC 826 is less than the holding current Ihold, the TRIAC 826 is switched off again, and the rotor continues to rotate clockwise due to the effect of inertia.

At a time instant t4, the rotor magnetic field Hb detected by the position sensor 820 changes to be South from North, the AC power supply is still in the positive half cycle and the TRIAC 826 is switched on, the two nodes A and B are shorted, and there is no current flowing through the AC-DC conversion circuit 828. After the AC power supply enters the negative half cycle, the current flowing through the two anodes T1 and T2 of the TRIAC 826 is gradually decreased, and the TRIAC 826 is switched off at a time instant t5. Then the current flows through the second anode T2 and the control electrode G of the TRIAC 826, the diode D6, the resistor R4, the position sensor 820, the resistor R2 and the stator winding 816 sequentially. As the drive current is gradually increased, the TRIAC 826 is switched on again at a time instant t6, the two nodes A and B are shorted again, the resistors R1 and R2 do not consume electric energy, and the output of the position sensor 820 is stopped due to no power is supplied. There is a larger reverse current flowing through the stator winding 816, and the rotor 814 continues to be driven clockwise since the rotor magnetic field is South. From the time instant t5 to the time instant t6, the first zener diode Z1 and the second zener diode Z2 are switched on, hence, there is a voltage output between the two output terminals C and D of the AC-DC conversion circuit 828. At a time instant t7, the AC power supply enters the positive half cycle again, the TRIAC 826 is switched off when the current flowing through the TRIAC 826 crosses zero, and then a voltage of the control circuit is gradually increased. As the voltage is gradually increased, a current begins to flow through the AC-DC conversion circuit 828, the output terminal H1 of the position sensor 820 outputs a low level, there is no drive current flowing through the control electrode G and the second anode T2 of the TRIAC 826, hence, the TRIAC 826 is switched off. Since the current flowing through the stator winding 816 is very small, nearly no driving force is generated for the rotor 814. At a time instant t8, the power supply is in the positive half cycle, the position sensor outputs a low level, the TRIAC 826 is kept to be switched off after the current crosses zero, and the rotor continues to rotate clockwise due to inertia. According to an embodiment of the present invention, the rotor may be accelerated to be synchronized with the stator after rotating only one circle after the stator winding is energized.

In the embodiment of the present invention, by taking advantage of a feature of a TRIAC that the TRIAC is kept to be switched on although there is no drive current flowing though the TRIAC once the TRIAC is switched on, it is avoided that a resistor in the AC-DC conversion circuit still consumes electric energy after the TRIAC is switched on, hence, the utilization efficiency of electric energy can be improved significantly.

Figure 7:
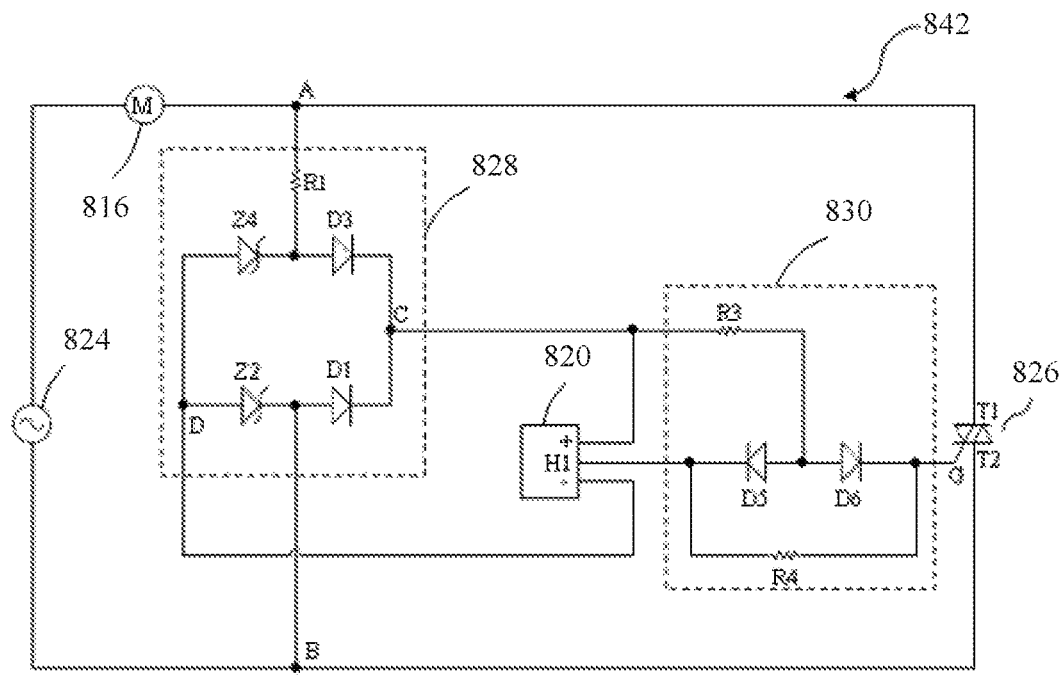
FIGS. 7 to 10 illustrate different embodiments of a drive circuit of a synchronous motor, according to an embodiment of the present disclosure.

FIG. 7 shows a circuit diagram of a drive circuit 842 for a synchronous motor according to an embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes a first diode D1 and a third diode D3 reversely connected in series, and the other of the two rectifier branches includes a second zener diode Z2 and a fourth zener diode Z4 reversely connected in series, the high voltage output terminal C of the AC-DC conversion circuit 828 is formed at a connection point of a cathode of the first diode D1 and a cathode of the third diode D3, and the low voltage output terminal D of the AC-DC conversion circuit 828 is formed at a connection point of an anode of the second zener diode Z2 and an anode of the fourth zener diode Z4. The output terminal C is connected to a positive power supply terminal of the position sensor 820, and the output terminal D is connected to a negative power supply terminal of the position sensor 820. The switch control circuit 30 includes a third resistor R3, a fourth resistor R4, and a fifth diode D5 and a sixth diode D6 reversely connected in series between the output terminal H1 of the position sensor 820 and the control electrode G of the controllable bidirectional AC switch 826. A cathode of the fifth diode D5 is connected to the output terminal H1 of the position sensor, and a cathode of the sixth diode D6 is connected to the control electrode G of the controllable bidirectional AC switch. One terminal of the third resistor R3 is connected to the high voltage output terminal C of the AC-DC conversion circuit, and the other terminal of the third resistor R3 is connected to a connection point of an anode of the fifth diode D5 and an anode of the sixth diode D6. Two terminals of the fourth resistor R4 are connected to a cathode of the fifth diode D5 and a cathode of the sixth diode D6 respectively.

Figure 8:
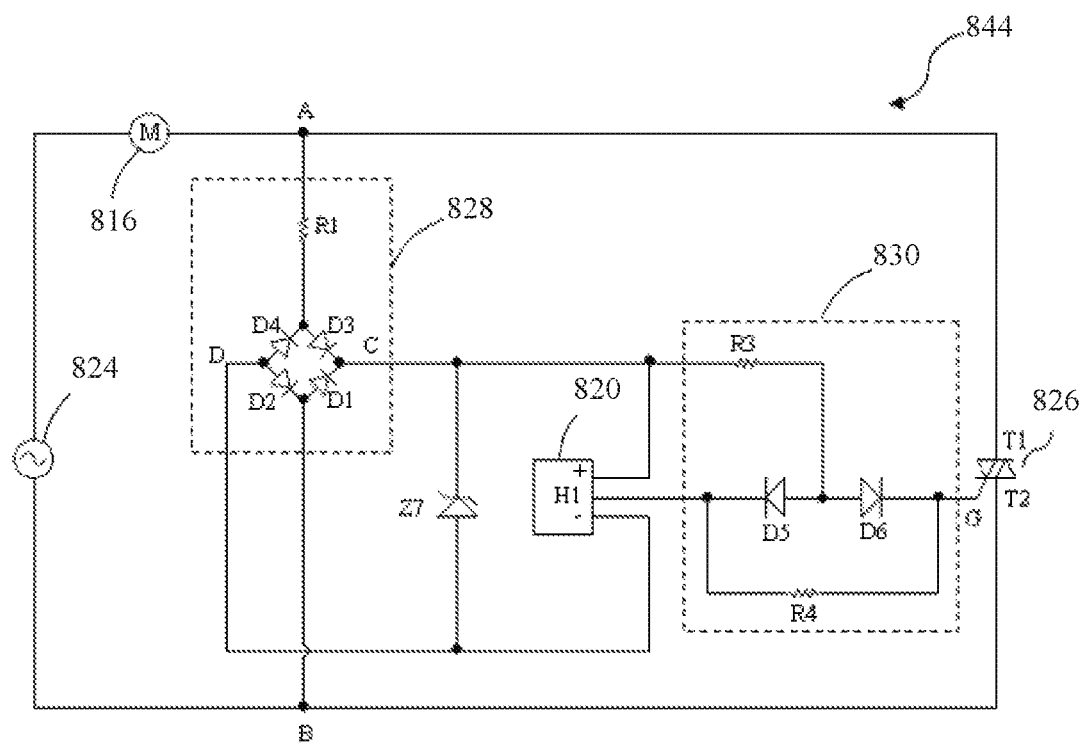

FIG. 8 shows a circuit diagram of a drive circuit 844 for a synchronous motor according to a further embodiment of the present invention. The drive circuit 844 is similar to the drive circuit 842 in the previous embodiment and, the drive circuit 844 differs from the drive circuit 842 in that, the zener diodes Z2 and Z4 in the drive circuit 842 are replaced by general diodes D2 and D4 in the rectifier of the drive circuit 844. In addition, a zener diode Z7 is connected between the two output terminals C and D of the AC-DC conversion circuit 828 in the drive circuit 844.

Figure 9:
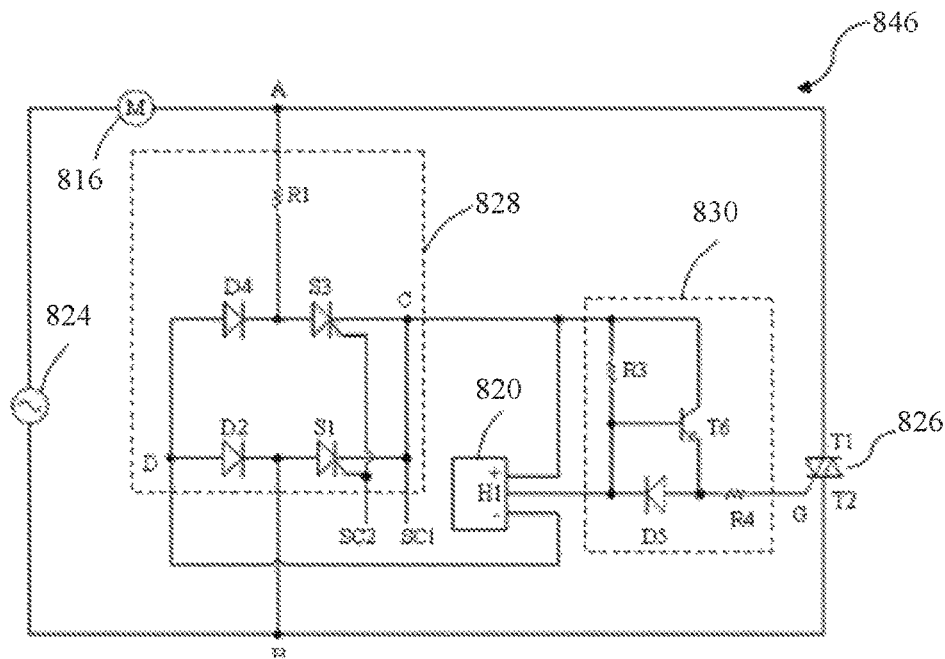

FIG. 9 shows a circuit diagram of a drive circuit 846 for a synchronous motor according to further embodiment of the present invention. The stator winding 816 of the synchronous motor is connected in series with the AC power supply 824 between the two nodes A and B. A first anode Ti of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes two silicon control rectifiers S1 and S3 reversely connected in series, and the other of the two rectifier branches includes a second diode D2 and a fourth diode D4 reversely connected in series. The high voltage output terminal C of the AC-DC conversion circuit 828 is formed at a connection point of a cathode of the silicon control rectifier S1 and a cathode of the silicon control rectifier S3, and the low voltage output terminal D of the AC-DC conversion circuit 828 is formed at a connection point of an anode of the second diode D2 and an anode of the fourth diode D4. The output terminal C is connected to a positive power supply terminal of the position sensor 820, and the output terminal D is connected to a negative power supply terminal of the position sensor 820. The switch control circuit 830 includes a third resistor R3, an NPN transistor T6, and a fourth resistor R4 and a fifth diode D5 connected in series between the output terminal H1 of the position sensor 820 and the control electrode G of the controllable bidirectional AC switch 826. A cathode of the fifth diode D5 is connected to the output terminal H1 of the position sensor. One terminal of the third resistor R3 is connected to the high voltage output terminal C of the AC-DC conversion circuit, and the other terminal of the third resistor R3 is connected to the output terminal H1 of the position sensor. A base of the NPN transistor T6 is connected to the output terminal H1 of the position sensor, an emitter of the NPN transistor T6 is connected to an anode of the fifth diode D5, and a collector of the NPN transistor T6 is connected to the high voltage output terminal C of the AC-DC conversion circuit.

In this embodiment, a reference voltage may be input to the cathodes of the two silicon control rectifiers S1 and S3 via a terminal SC1, and a control signal may be input to control terminals of S1 and S3 via a terminal SC2. The rectifiers S1 and S3 are switched on in a case that the control signal input from the terminal SC2 is a high level, or are switched off in a case that the control signal input from the terminal SC2 is a low level. Based on the configuration, the rectifiers S1 and S3 may be switched between a switch-on state and a switch-off state in a preset way by inputting the high level from the terminal SC2 in a case that the drive circuit operates normally. The rectifiers S1 and S3 are switched off by changing the control signal input from the terminal SC2 from the high level to the low level in a case that the drive circuit fails. In this case, the TRIAC 826, the conversion circuit 828 and the position sensor 820 are switched off, to ensure the whole circuit to be in a zero-power state.

Figure 10:
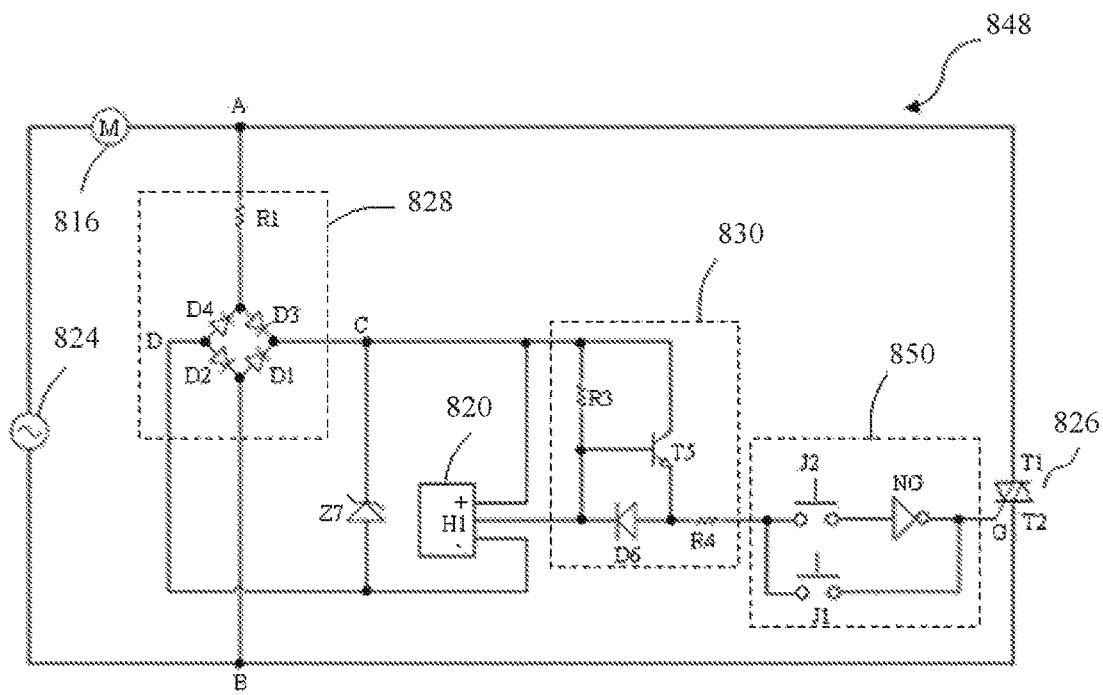

FIG. 10 shows a circuit diagram of a drive circuit 848 for a synchronous motor according to another embodiment of the present invention. The drive circuit 848 is similar to the drive circuit 846 in the previous embodiment and, the drive circuit 848 differs from the drive circuit 846 in that, the silicon control diodes S1 and S3 in the drive circuit 846 are replaced by general diodes D1 and D3 in the rectifier of the drive circuit 848, and a zener diode Z7 is connected between the two terminals C and D of the AC-DC conversion circuit 828. In addition, in the drive circuit 848 according to the embodiment, a preset steering circuit 850 is disposed between the switch control circuit 30 and the TRIAC 826. The preset steering circuit 850 includes a first jumper switch J1, a second jumper J2 switch and an inverter NG connected in series with the second jumper switch J2. Similar to the drive circuit 846, in this embodiment, the switch control circuit 830 includes the resistor R3, the resistor R4, the NPN transistor T5 and the diode D6. One terminal of the resistor R4 is connected to a connection point of an emitter of the transistor T5 and an anode of the diode D6, and the other terminal of the resistor R4 is connected to one terminal of the first jumper switch J1, and the other terminal of the first jumper switch J1 is connected to the control electrode G of the TRIAC 826, and the second jumper switch J2 and the inverter NG connected in series are connected across two terminals of the first jumper switch J1. In this embodiment, when the first jumper switch J1 is switched on and the second jumper switch J2 is switched off, similar to the above embodiments, the rotor 814 still starts clockwise; when the second jumper switch J2 is switched on and the first jumper switch J1 is switched off, the rotor 814 starts counterclockwise. In this case, a starting direction of the rotor in the motor may be selected by selecting one of the two jumper switches to be switched on and the other to be switched off. Therefore, in a case that a driving motor is needed to be supplied for different applications having opposite rotational directions, it is just needed to select one of the two jumper switches J1 and J2 to be switched on and the other to be switched off, and no other changes need to be made to the drive circuit, hence, the drive circuit according to this embodiment has good versatility.

Figure 11:
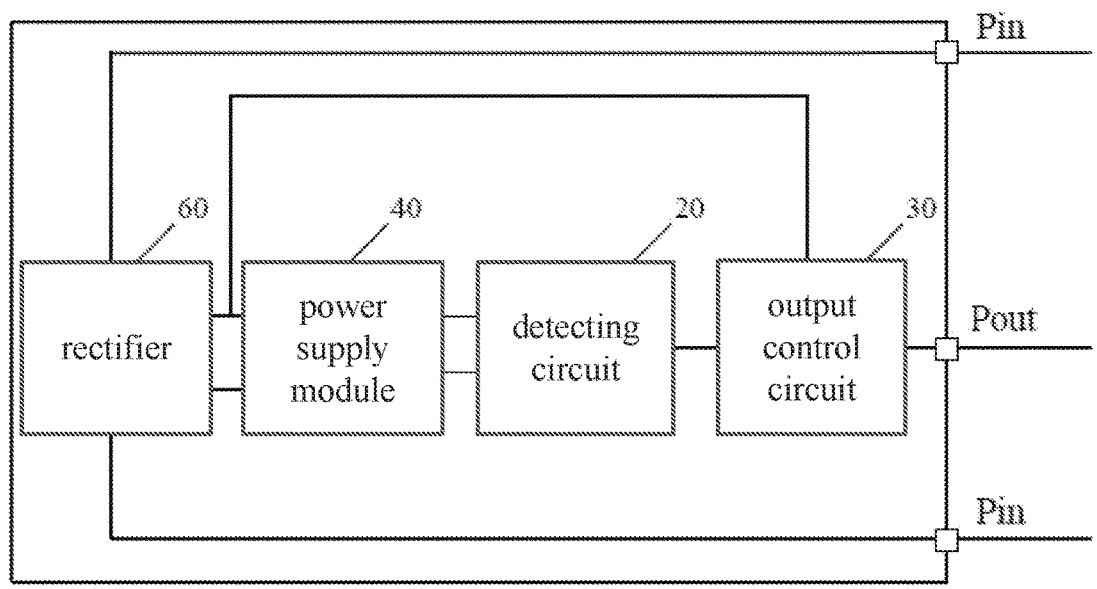
FIG. 11 is a schematic structural diagram of a sensor integrated circuit according to an embodiment of the present disclosure.

Referring to FIG. 11, a sensor integrated circuit provided according to an embodiment of the present disclosure includes a housing, a semiconductor substrate arranged inside the housing, input ports Pin and an output port Pout which extend out from the housing, and an electronic circuitry arranged on the semiconductor substrate. The input ports Pin may be connected to an external power supply. The electronic circuitry includes a rectifier 60, a power supply module 40, an output control circuit 30 and a detecting circuit 20.

The rectifier 60 is configured to convert the external power supply into a first direct current power supply.

The power supply module 40 is configured to generate a second direct current power supply different from the first direct current power supply. Preferably, the power supply module 40 includes a voltage regulator. The voltage regulator may be powered by the first direct current power supply and generate the second direct current power supply.

The detecting circuit 20 is powered by the second direct current power supply and is configured to detect a predetermined signal inputted to the sensor integrated circuit and generate a control signal corresponding to the detected signal in response to the detected signal.

The output control circuit 30 is configured to control, in response to at least the control signal, the sensor integrated circuit to operate in at least one of a first state in which a current flows from the output port Pout to an outside of the sensor integrated circuit and a second state in which a current flows from the outside of the sensor integrated circuit to the output port Pout.

In the present disclosure, the input ports Pin may be connected to both terminals of the external power supply directly or with an external load connected in series to the input ports across the external power supply, which is not limited herein and may be determined according to practical conditions.

With the sensor integrated circuit provided in the present embodiment, functions of an existing sensor integrated circuit are extended, which can reduce the overall circuit cost and improve the circuit reliability.

Preferably, the detecting circuit 20 includes a magnetic sensor. The magnetic sensor is configured to detect an external magnetic field and output a magnetic field detection signal matching with the external magnetic field. The magnetic field detection signal serves as the control signal.

In a case that the detecting circuit 20 includes the magnetic sensor, functions of an existing magnetic sensor are extended with the sensor integrated circuit according to the embodiment of the present disclosure, which can reduce the overall circuit cost and improve the circuit reliability.

Preferably, a voltage supplied to the output control circuit 30 is different from a voltage of the second direct current power supply.

Preferably, the output control circuit 30 is powered by the first direct current power supply, as shown in FIG. 11. The detecting circuit 20 is powered by the second direct current power supply different from the first direct current power supply. It should be noted that, in an embodiment of the present disclosure, the first direct current power supply may supply a voltage with variable amplitude or constant amplitude. The second direct current power supply preferably supplies a voltage with constant amplitude, to ensure that a stable power supply signal is provided to the detecting circuit 20 for stable operation.

Preferably, an average voltage of the first direct current power supply outputted by the rectifier 60 is higher than an average voltage of the second direct current power supply outputted by the power supply module 40. The power consumption of the sensor integrated circuit may be reduced by supplying power to the detecting circuit 20 with a lower voltage. A large load current may be provided from the output port Pout by supplying power to the output control circuit 30 with a higher voltage, to ensure a sufficient drive capability of the sensor integrated circuit.

Apparently, the output control circuit 30 is not necessarily limited to be powered by the first direct current power supply, which may be determined according to practical conditions. FIG. 11 is provided only for illustration, and any solutions for powering the output control circuit 30 fall within the protection scope of the present disclosure.

Figure 12:
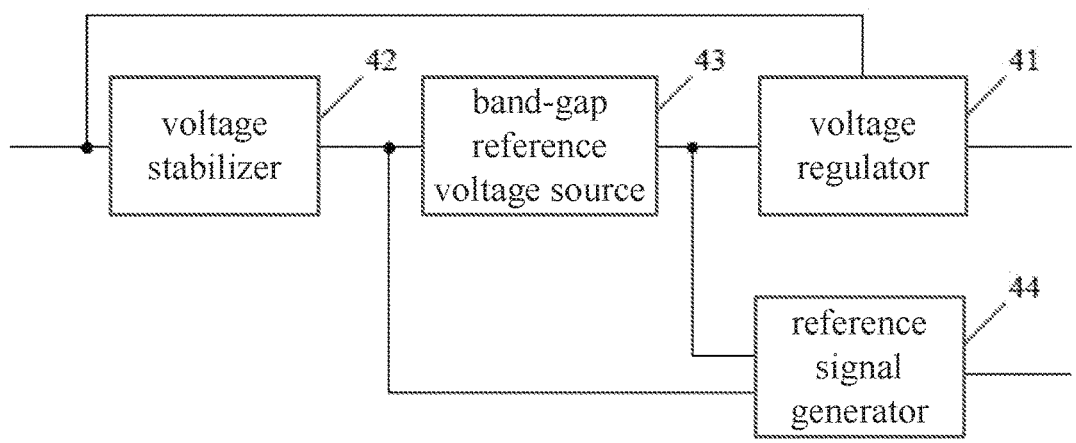
FIG. 12 is a schematic structural diagram of a power supply module of a sensor integrated circuit according to an embodiment of the present disclosure.

In a preferred embodiment as shown in FIG. 12, the power supply module 40 includes a voltage stabilizer 42 and a band-gap reference voltage source 43 in addition to the voltage regulator 41.

The voltage stabilizer 42 is configured to stabilize a voltage of the first direct current power supply to a lower voltage serving as a third direct current power supply.

The band-gap reference voltage source 43 is powered by the third direct current power supply and is configured to generate a reference voltage lower than the voltage of the third direct current power supply.

The voltage regulator 41 is powered by the first direct current power supply and is configured to generate the second direct current power supply based on the reference voltage.

In a specific example, the voltage of the first direct current power supply outputted by the rectifier 60 may be of a dozen of volts. The voltage stabilizer 42 is connected to the first direct current power supply outputted by the rectifier 60 and stabilizes a voltage of the first direct current power supply to a lower voltage (for example, 3.5V) serving as the third direct current power supply. The third direct power supply outputted by the voltage stabilizer 42 supplies power to the band-gap reference voltage source 43 which generates the reference voltage (for example, 1.25V) lower than the voltage of the third direct current power supply. The voltage regulator 41 generates the second direct current power supply (for example, 2.5V) based on the reference voltage. The voltage of the second direct current power supply may be higher that the reference voltage and lower than the voltage of the third direct current power supply. The voltage regulator 41 is powered by the higher first direct current power supply, which can improve the overall responding speed of the integrated circuit.

In a preferred embodiment, the output control circuit 30 includes a first switch 31 and a second switch 32. The first switch 31 and the output port Pout are connected in a first current path. The second switch 32 and the output port Pout are connected in a second current path having a direction opposite to a direction of the first current path. The first switch 31 and the second switch 32 are turned on selectively under the control of the magnetic field detection signal. Preferably, the first switch 31 may be embodied as a triode, and the second switch 32 may be embodied as a diode or a triode, which however are not limited herein and may be determined according to practical conditions.

Figure 13:
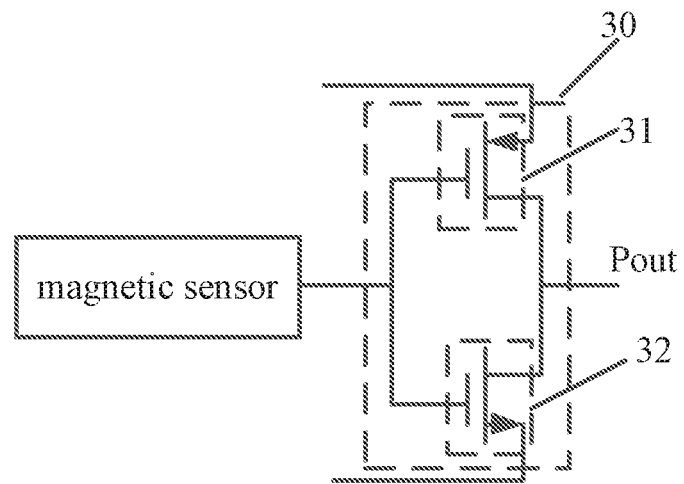
FIG. 13 is a circuit diagram of an output control circuit of a sensor integrated circuit according to an embodiment of the present disclosure.

In a specific implementation as shown in FIG. 13, the first switch 31 and the second switch 32 are embodied as a pair of complementary semiconductor switches. The first switch 31 is turned on at a lower level, and the second switch 32 is turned on at a higher level. The first switch 31 and the output port Pout are connected in the first current path. The second switch 32 and the output port Pout are connected in the second current path. Control terminals of both the first switch 31 and the second switch 32 are connected to the magnetic sensor. A current input terminal of the first switch 31 is connected to a higher voltage (for example, a direct current power supply) and a current output terminal of the first switch 31 is connected to a current input terminal of the second switch 32. A current output terminal of the second switch 32 is connected to a lower voltage (for example, the ground). In a case that magnetic field detection information outputted by the magnetic sensor is at a low level, the first switch 31 is turned on and the second switch 32 is turned off, resulting in a load current flowing from the higher voltage to the outside of the sensor integrated circuit through the first switch 31 and the output port Pout. In a case that magnetic field detection information outputted by the magnetic sensor is at a high level, the second switch 32 is turned on and the first switch 31 is turned off, resulting in a load current flowing from the outside of the sensor integrated circuit to the output port Pout and flowing through the second switch 32. In the embodiment as shown in FIG. 13, the first switch 31 is embodied as a positive channel metal-oxide-semiconductor field-effect transistor (P-type MOSFET), and the second switch 32 is embodied as a negative channel metal-oxide-semiconductor field-effect transistor (N-type MOSFET). It can be understood that the first switch and the second switch in another embodiment may be embodied as other types of semiconductor switches, such as a junction field-effect transistor (JFET) or a metal semiconductor field-effect transistor (MESFET) or other field-effect transistors.

Figure 14:
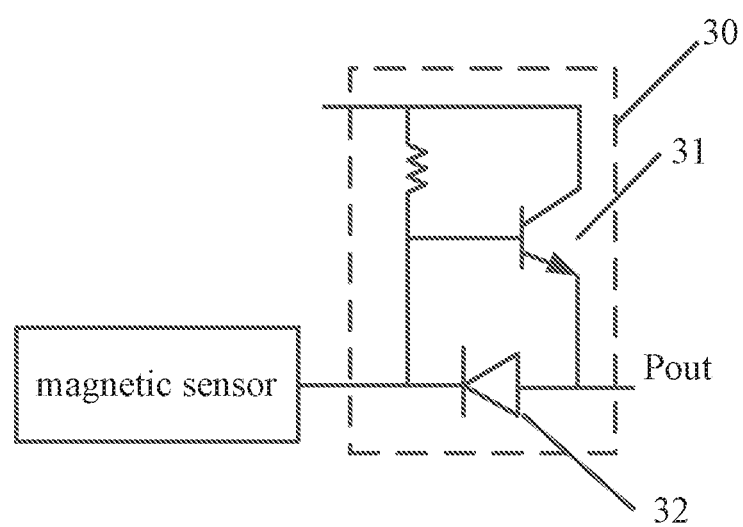
FIG. 14 is a circuit diagram of an output control circuit of a sensor integrated circuit according to an embodiment of the present disclosure.

In another implementation as shown in FIG. 14, the first switch 31 is embodied as a switch transistor that is turned on at a high level, and the second switch 32 is embodied as a unidirectional conductive diode. A control terminal of the first switch 31 and a cathode of the second switch 32 are connected to the detecting circuit 20. A current input terminal of the first switch 31 is connected to the output terminal of the rectifier 60. Both a current output terminal of the first switch 31 and an anode of the second switch 32 are connected to the output port Pout. The first switch 31 and the output port Pout are connected in the first current path. The output port Pout, the second switch 32 and the magnetic sensor are connected in the second current path. In a case that magnetic field detection information outputted by the magnetic sensor is at a high level, the first switch 31 is turned on and the second switch 32 is turned off, resulting in a load current flowing from the rectifier 60 to the outside of the sensor integrated circuit through the first switch 31 and the output port Pout. In a case that magnetic field detection information outputted by the magnetic sensor is at a low level, the second switch 32 is turned on and the first switch 31 is turned off, resulting in a load current flowing from the outside of the sensor integrated circuit to the output port Pout and flowing through the second switch 32. It can be understood that the first switch 31 and the second switch 32 in another embodiment may be in other structures, which is not limited herein and may be determined according to practical conditions.

In another embodiment of the present disclosure, the output control circuit 30 includes a first current path in which a current flows from the output port to the outside of the sensor integrated circuit, a second current path in which a current flows from the output port to an inside of the sensor integrated circuit and a switch connected in one of the first current path and the second current path. The switch is controlled based on magnetic field detection information outputted by the detecting circuit to cause the first current path and the second current path to be turned on selectively. Preferably, the other one of the first current path and the second current path does not include a switch.

Figure 15:
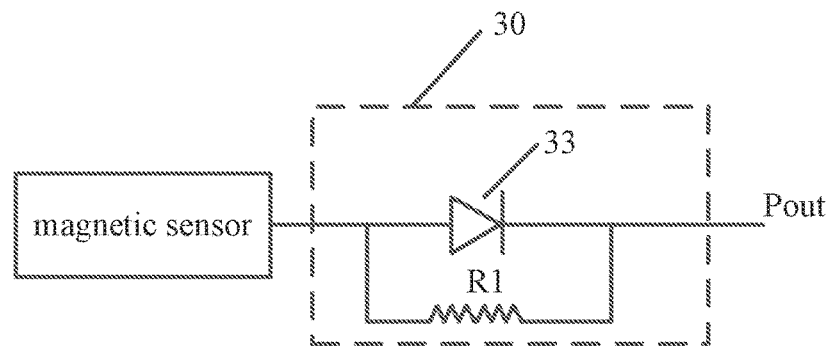
FIG. 15 is a circuit diagram of an output control circuit of a sensor integrated circuit according to an embodiment of the present disclosure.

In a specific implementation as shown in FIG. 15, a unidirectional switch 33 and the output port Pout are connected in the first current path. A current input terminal of the unidirectional switch 33 may be connected to an output terminal of the magnetic sensor. The output terminal of the magnetic sensor may also be connected to the output port Pout through a resistor R1 in the second current path having a direction opposite to a direction of the first current path. The unidirectional switch 33 is turned on in a case that the magnetic field detection signal is at a higher level, resulting in a load current flowing to the outside of the sensor integrated circuit through the unidirectional switch 33 and the output port Pout. The unidirectional switch 33 is turned off in a case that the magnetic field detection signal is at a lower level, resulting in a load current flowing from the outside of the sensor integrated circuit to the output port Pout and flowing through the resistor R1 and the detecting circuit 20.

Alternatively, the resistor R1 in the second current path may be replaced by another unidirectional switch connected in parallel reversely to the unidirectional switch 33. In this way, the load current flowing out from the output port is more balanced with the load current flowing into the output port.

Figure 15A:
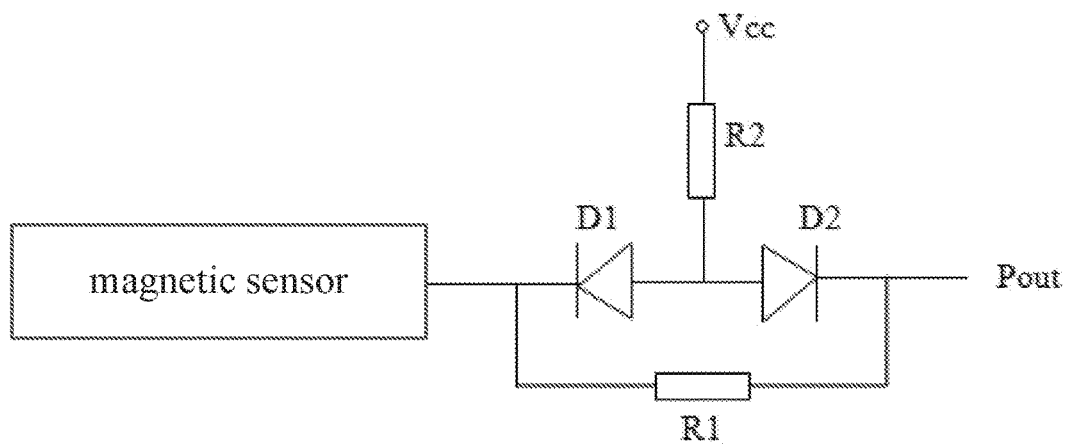
FIG. 15A is a schematic structural diagram of an output control circuit in a magnetic sensor integrated circuit according to an embodiment of the present disclosure.

In another specific implementation as shown in FIG. 15A, the output control circuit 30 includes diodes D1 and D2 which are connected in series reversely between the output terminal of the detecting circuit 20 and the output port Pout, a resistor R1 connected in parallel to the diodes D1 and D2 which are connected in series, and a resistor R2 connected between a power supply Vcc and a common terminal of the diodes D1 and D2. The cathode of the diode D1 is connected to the output terminal of the detecting circuit 20. The diode D1 is under the control of the magnetic field detection information. The diodes D1 is turned off in a case that the magnetic field detection information is at a high level, resulting in a load current flowing from the output port Pout to the outside of the sensor integrated circuit through the resistor R2 and the diode D2. In a case that the magnetic field detection information is at a low level, a load current flows from the outside of the sensor integrated circuit to the output port Pout and flows through the resistor R1 and the detecting circuit 20.

Figure 16:
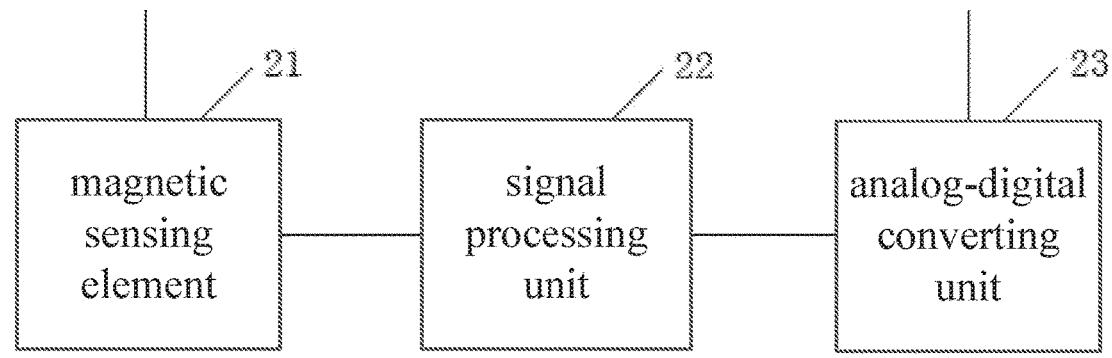
FIG. 16 is a schematic structural diagram of a detecting circuit of a sensor integrated circuit according to an embodiment of the present disclosure.

In an embodiment of the present disclosure as shown in FIG. 16, the detecting circuit 20 includes a magnetic sensor. The magnetic sensor includes a magnetic sensing element 21 configured to sense polarity of the external magnetic field and output an electric signal, a signal processing unit 22 configured to amplify and descramble the electric signal to generate an analog electric signal, and an analog-digital converting unit 23 configured to convert the amplified and descrambled analog electric signal into the magnetic field detection signal. For an application only requiring polarity of the external magnetic field to be identified, the magnetic field detection signal may be a switch-type digital signal. Preferably, the power supply module 40 further includes a reference signal generator 44 configured to generate another reference voltage based on the reference voltage output from the band-gap reference voltage source and provide said another reference voltage to the analog-digital converting unit, as shown in FIG. 12.

In a preferred embodiment, the external power supply is an alternate current power supply, and the output control circuit 30 may be configured to control, based on information on the alternate current power supply and the magnetic field detection signal, the sensor integrated circuit to switch at least between the first state in which a current flows from the output port Pout to the outside of the sensor integrated circuit and the second state in which a current flows from the outside of the sensor integrated circuit to the output port Pout. It should be noted that, in the embodiments of the present disclosure, the switching of operation state of the sensor integrated circuit between the first state and the second state is not limited to the case of immediately switching to one state after the other state ends, further including the case of switching to one state after an interval time following the other state elapses. In a preferred application, no output comes from the output port of the sensor integrated circuit during the interval time for switching between the first state and the second state.

In a specific implementation, the sensor integrated circuit may operate in the first state in which a current flows from the output port Pout to the outside of the sensor integrated circuit and the second state in which a current flows from the outside of the sensor integrated circuit to the output port Pout. The output control circuit 30 is configured to control the sensor integrated circuit to: operate in one of the first state and the second state in a case that the magnetic field detection signal indicates that the external magnetic field is in first magnetic polarity and the alternate current power supply is in first electric polarity; and operate in the other one of the first state and the second state in a case that the magnetic field detection signal indicates that the external magnetic field is in second magnetic polarity opposite to the first magnetic polarity and the alternate current power supply is in second electric polarity opposite to the first electric polarity.

More specifically, the output control circuit 30 may be configured to: cause a load current flowing through the output port Pout in a case that the alternate current power supply is in a positive half-period and the magnetic field detection signal indicates that the external magnetic field is in first magnetic polarity or in a case that the alternate current power supply is in a negative half-period and the magnetic field detection signal indicates that the external magnetic field is in second magnetic polarity opposite to the first magnetic polarity; and cause no load current flowing through the output port Pout in a case that the alternate current power supply is in a positive half-period and the magnetic field detection signal indicates that the external magnetic field is in the second magnetic polarity or in a case that the alternate current power supply is in a negative half-period and the magnetic field detection signal indicates that the external magnetic field is in the first magnetic polarity. It should be noted that, the situation of a load current flowing through the output port in a case that the alternate current power supply is in a positive half-period and the external magnetic field is in the first magnetic polarity or in a case that the alternate current power supply is in a negative half-period and the external magnetic field is in the second magnetic polarity includes both a situation that a load current flows through the output port for the whole duration of either of the above two cases, and a situation that a load current flows through the output port for a part of duration of either of the above two cases.

In a specific embodiment of the present disclosure on the basis of any one of the above embodiments, the rectifier includes a full-wave rectifier bridge and a voltage stabilizing unit connected in series to an output of the full-wave rectifier bridge. The full-wave rectifier bridge is configured to convert alternate current power outputted by the alternate current power supply into direct current power. The voltage stabilizing unit is configured to stabilize the direct current power outputted by the full-wave rectifier bridge within a predetermined range.

FIG. 7 shows a specific circuit of the rectifier. The voltage stabilizing unit includes a zener diode 621 connected between two output terminals of the full-wave rectifier bridge. The full-wave rectifier bridge includes a first diode 611 and a second diode 612 which are connected in series, and a third diode 613 and a fourth diode 614 which are connected in series. A common terminal of the first diode 611 and the second diode 612 is electrically connected to a first input port VAC+. And a common terminal of the third diode 613 and the fourth diode 614 is electrically connected to a second input port VAC−.

An input terminal of the first diode 611 is electrically connected to an input terminal of the third diode 613 to form a grounded output terminal of the full-wave rectifier bridge. An output terminal of the second diode 612 is electrically connected to an output terminal of the fourth diode 614 to form a voltage output terminal VDD of the full-wave rectifier bridge. The zener diode 621 is connected between a common terminal of the second diode 612 and the fourth diode 614 and a common terminal of the first diode 611 and the third diode 613. It should be noted that, in an embodiment of the present disclosure, a power supply terminal of the output control circuit may be electrically connected to a voltage output terminal of the full-wave rectifier bridge.

The magnetic sensor integrated circuit according to an embodiment of the present disclosure is described in conjunction with a specific application below.

Figure 18:
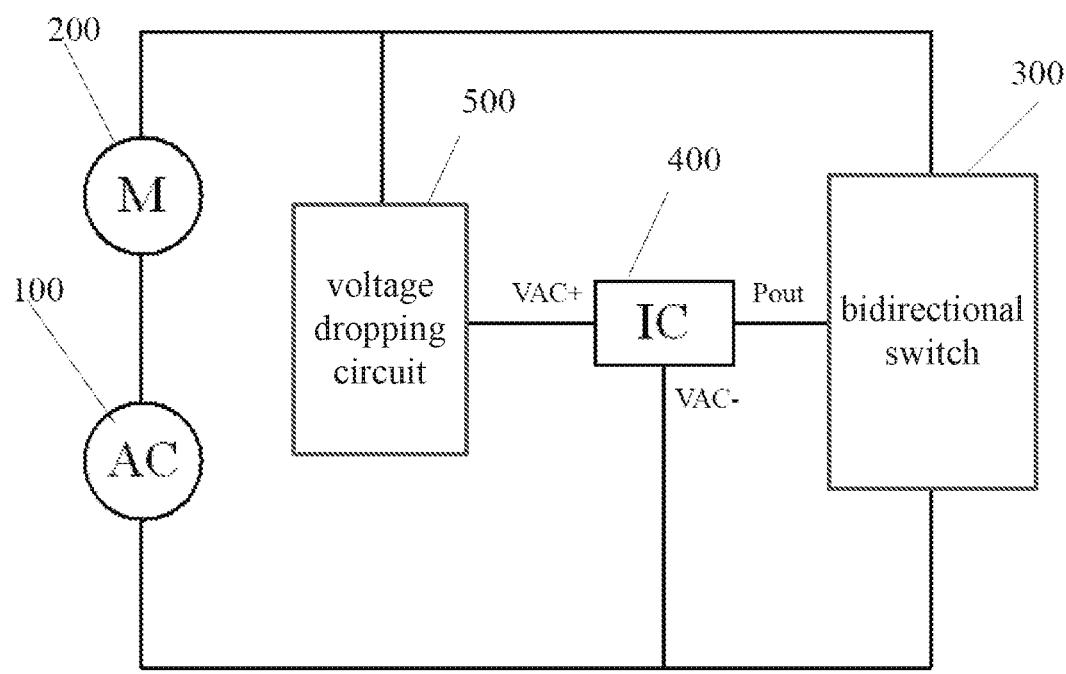
FIG. 18 is a circuit structural diagram of a motor component according to an embodiment of the present disclosure.

Referring to FIG. 18, a motor component is further provided according to an embodiment of the present disclosure. The motor component includes a motor 200 powered by an alternate power supply 100, a bidirectional switch 300 connected in series to the motor 200, and a magnetic sensor integrated circuit 400 according to any one of the above embodiments. The output port of the magnetic sensor integrated circuit 400 is electrically connected to a control terminal of the bidirectional switch 300. Preferably, the bidirectional switch 300 may be a triode AC semiconductor switch (TRIAC). It can be understood that the bidirectional switch may be implemented as an appropriate switch of other types. For example, the bidirectional switch may include two silicon controlled rectifiers connected in parallel reversely and a respective control circuit arranged to control the two silicon controlled rectifiers based on an output signal from the output port of the magnetic sensor integrated circuit in accordance with a predetermined rule.

Preferably, the motor component further includes a voltage dropping circuit 500 configured to drop a voltage of the alternate current power supply 100 to provide the dropped voltage to the magnetic sensor integrated circuit 400. The magnetic sensor integrated circuit 400 is mounted near to a rotor of the motor 200 to sense the variation of the magnetic field of the rotor.

Figure 19:
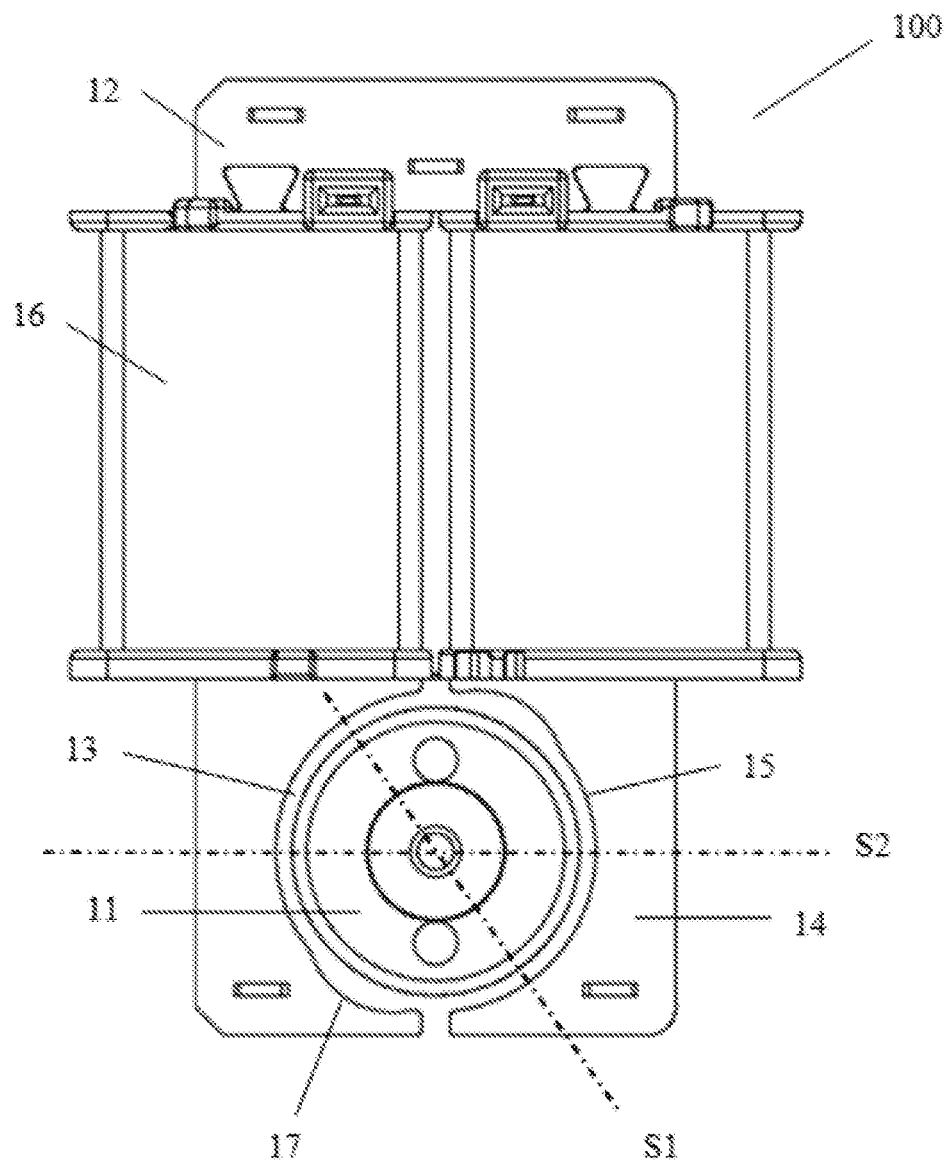
FIG. 19 is a structural diagram of a motor in a motor component according to an embodiment of the present disclosure.

In a specific embodiment of the present disclosure, the motor is a synchronous motor. It can be understood that the driving circuit according to the disclosure is applicable to not only a synchronous motor but also a permanent magnet motor of other types, such as a direct current brushless motor. Referring to FIG. 19, the synchronous motor includes a stator and a rotor 11 rotatable relative to the stator. The stator includes a stator core 12 and a stator winding 16 wound on the stator core 12. The stator core 12 may be made of soft magnetic materials such as pure iron, cast iron, cast steel, electrical steel, silicon steel. The rotor 11 includes a permanent magnet. The rotor 11 operates at a constant rotational speed of 60 f/p revs/min during a steady state phase in a case that the stator winding 16 is connected in series to an alternate current power supply, where f denotes a frequency of the AC power supply and p denotes the number of pole pairs of the rotor. In the embodiment, the stator core 12 includes two poles 14 opposite to each other. Each of the poles 14 includes a pole arc 15. An outside surface of the rotor 11 is opposite to the pole arc 15 with a substantially uniform air gap 13 formed between the outside surface of the rotor 11 and the pole arc 15. The "substantially uniform air gap" in the present disclosure means that a uniform air gap is formed in most space between the stator and the rotor, and a non-uniformed air gap is formed in a small part of the space between the stator and the rotor. Preferably, a starting groove 17 which is concave may be disposed in the pole arc 15 of the pole of the stator, and a part of the pole arc 15 other than the starting groove 17 may be concentric with the rotor. With the configuration described above, a non-uniform magnetic field may be formed, to ensure that a polar axis S1 of the rotor has an angle of inclination relative to a central axis S2 of the pole of the stator when the rotor is at rest, thereby allowing the rotor to have a starting torque under the action of the integrated circuit every time the motor is energized. Specifically, the "pole axis S1 of the rotor" refers to a boundary between two magnetic poles having different polarities, and the "central axis S2 of the pole 14 of the stator" refers to a connection line passing central points of the two poles 14 of the stator. In the embodiment, each of the stator and the rotor includes two magnetic poles. It can be understood that the number of magnetic poles of the stator may not be equal to the number of magnetic poles of the rotor, and the stator and the rotor may have more magnetic poles, such as 4 or 6 magnetic poles in other embodiments.

Figure 17:
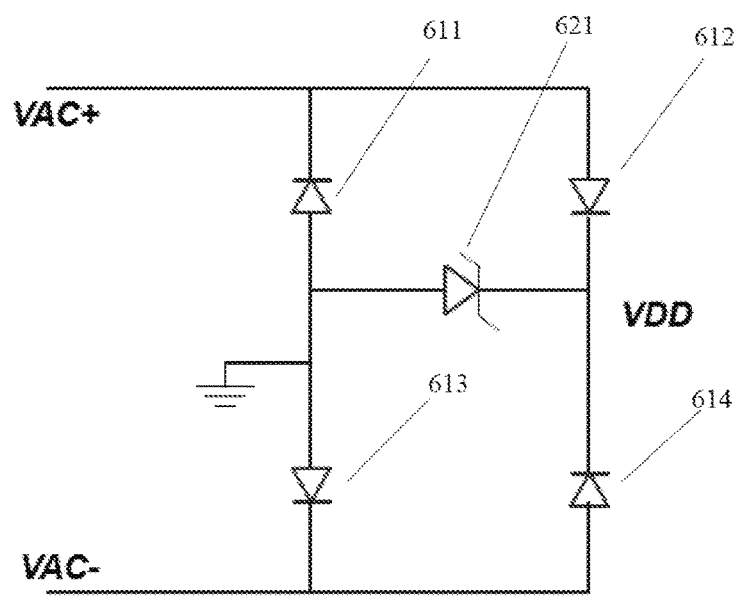
FIG. 17 is a circuit diagram of a rectifier of a sensor integrated circuit according to an embodiment of the present disclosure.

In a preferred embodiment of the present disclosure, the bidirectional switch 300 is embodied as a triode AC semiconductor switch (TRIAC), the rectifier has a circuit as shown in FIG. 17, and the output control circuit has a circuit as shown in FIG. 14. The current input terminal of the first switch 31 of the output control circuit 30 is connected to the voltage output terminal of the full-wave rectifier bridge, and the current output terminal of the second switch 32 is connected to the grounded output terminal of the full-wave rectifier bridge. In a case that a signal outputted by the alternate current power supply 100 is in the positive half-period and the detecting circuit 20 outputs a low level, the first switch 31 of the output control circuit 30 is turned on and the second switch 32 is turned off, resulting in a current flowing through the alternate current power supply 100, the motor 200, a first input terminal of the integrated circuit 400, the voltage dropping circuit, the output terminal of the second diode 612 of the full-wave rectifier bridge, the first switch 31 of the output control circuit 30 in the listed sequence and flowing from the output port back to the alternate current power supply 100 through the bidirectional switch 300. After the TRIAC 300 is turned on, a series branch formed by the voltage dropping circuit 500 and the magnetic sensor integrated circuit 400 is short-circuited. The magnetic sensor integrated circuit 400 stops outputting due to not being supplied with a voltage. However, the TRIAC 300 is still turned on even in a case that no driving current flows between a control electrode and a first anode of the TRIAC 300 because a current flowing through both of anodes of the TRIAC 300 is large enough (higher than a maintaining current of the TRIAC 300). In a case that a signal outputted by the alternate current power supply 100 is in the negative half-period and the detecting circuit 20 outputs a high level, the first switch 31 of the output control circuit 30 is turned off and the second switch 32 is turned on, resulting in a current flowing from the alternate current power supply 100 to the output port through the bidirectional switch 300, and flowing back to the alternate current power supply 100 through the second switch 32 of the output control circuit 30, the grounded output terminal of the full-wave rectifier bridge, the first diode 611, the first input terminal of the integrated circuit 400 and the motor 200. Similarly, after the TRIAC 300 is turned on, the magnetic sensor integrated circuit 400 stops outputting due to being short-circuited, while the TRIAC 300 may continue to be turned on. In a case that a signal outputted by the alternate current power supply 100 is in the positive half-period and the detecting circuit 20 outputs a high level or in a case that a signal outputted by the alternate current power supply 100 is in the negative half-period and the detecting circuit 20 outputs a low level, none of the first switch 31 and the second switch 32 of the output control circuit 30 is turned on, and the TRIAC 300 is turned off. Therefore, the output control circuit 30 can control, based on the change of polarity of the alternate current power supply 100 and the magnetic field detection information, the bidirectional switch 300 to be turned on or off in a predetermined manner, and thereby control the energizing of the stator winding 16 such that the changing magnetic field generated by the stator fits a position of a magnetic field of the rotor to drag the rotor to rotate in a single direction, thereby enabling the rotor to rotate in a fixed direction every time the motor is energized.

In a motor component according to another embodiment of the present disclosure, a motor and a bidirectional switch may be connected in series across an external alternate current power supply. A first series branch formed by the motor and the bidirectional switch is connected in parallel to a second series branch formed by a voltage dropping circuit and a magnetic sensor integrated circuit. The output port of the magnetic sensor integrated circuit is connected to the bidirectional switch to control the bidirectional switch to be turned on or off in a predetermined manner and thereby control the energizing of the stator winding.

The motor component provided according to the above embodiment is especially applicable to a pump, a fan, a household electric appliance and a vehicle, but is not limited thereto. The household electric appliance may be, for example, a washing machine, a dish washing machine, a kitchen ventilator, an exhaust fun, or the like.

The above only describes preferred embodiments of the present disclosure, which are not intended to limit the present disclosure in any manner. The preferred embodiments of the present disclosure are disclosed above, but should not be interpreted as limit to the present disclosure. Numerous alternations, modifications, and equivalents can be made to the technical solution of the present disclosure by those skilled in the art in light of the methods and technical content disclosed herein without deviating from the scope of the present disclosure. Therefore, any alternations, modifications, and equivalents made to the embodiments above according to the technical essential of the present disclosure without deviating from the content of the present disclosure should fall within the scope of protection of the present disclosure.

The invention claimed is:

1. A sensor integrated circuit, comprising: a housing, a semiconductor substrate arranged inside the housing, an output port extending out from the housing, input ports configured to connect an alternate current power supply, and an electronic circuitry arranged on the semiconductor substrate, wherein the electronic circuitry comprises a rectifier, a power supply module, an output control circuit and a detecting circuit, wherein the rectifier is configured to convert the alternate current power supply into a first direct current power supply;

the power supply module comprises a voltage regulator configured to generate a second direct current power supply different from the first direct current power supply;

the detecting circuit is powered by the second direct current power supply and is configured to detect a signal inputted to the sensor integrated circuit and correspondingly generate a control signal;

the output control circuit is directly powered by the first direct current power supply, an average value of the first direct current power supply is higher than an average value of the second direct current power supply;

the output control circuit is coupled to a control terminal of a controllable bidirectional alternate current switch and the output control circuit controls the controllable bidirectional alternate current switch to be switched between a switch-on state and a switch-off state at least according to a polarity of the alternate current power supply and the control signal; when the control signal is at a first level and the alternate current power supply is in a positive half-period, a current flows from the output port to an outside of the sensor integrated circuit to control the controllable bidirectional alternate current switch to be on the switch-on state; when the control signal is at a second level and the alternate current power supply is in a negative half-period, the current flows from the outside of the integrated circuit to the output port to control the controllable bidirectional alternate current switch to be on the switch-off state.

2. The sensor integrated circuit according to claim 1, wherein the detecting circuit comprises a magnetic sensor configured to detect an external magnetic field and output a magnetic field detection signal matching with the external magnetic field, and the magnetic field detection signal serves as the control signal.

3. The sensor integrated circuit according to claim 2, wherein the power supply module further comprises a voltage stabilizer and a band-gap reference voltage source, wherein the voltage stabilizer is configured to stabilize a voltage of the first direct current power supply to a lower voltage serving as a third direct current power supply;

the band-gap reference voltage source is powered by the third direct current power supply and is configured to generate a reference voltage lower than the voltage of the third direct current power supply; and the voltage regulator is powered by the first direct current power supply and is configured to generate the second direct current power supply based on the reference voltage.

4. The sensor integrated circuit according to claim 3, wherein a voltage of the second direct current power supply is lower than the voltage of the third direct current power supply.

5. The sensor integrated circuit according to claim 3, wherein the magnetic sensor comprises:

a magnetic sensing element, configured to sense polarity of the external magnetic field and output an electric signal;

a signal processing unit, configured to amplify and descramble the electric signal to generate an analog electric signal; and an analog-digital converting unit, configured to convert the analog electric signal into a logic high level signal or a logic low level signal; and the power supply module further comprises a reference signal generator configured to generate a reference voltage based on the reference voltage output from the band-gap reference voltage source and provide the reference voltage to the analog-digital converting unit.

6. The sensor integrated circuit according to claim 2, wherein the output control circuit comprises a first switch and a second switch, the first switch and the output port are connected in a first current path, the second switch and the output port are connected in a second current path having a direction opposite to a direction of the first current path, and the first switch and the second switch are turned on selectively under the control of the magnetic field detection signal.

7. The sensor integrated circuit according to claim 2, wherein the output control circuit comprises a first current path in which a current flows from the output port to the outside of the sensor integrated circuit, a second current path in which a current flows from the output port to an inside of the sensor integrated circuit, and a switch connected in one of the first current path and the second current path; and the switch is controlled based on magnetic field detection information outputted by the detecting circuit to cause the first current path and the second current path to be turned on selectively.

8. The sensor integrated circuit according to claim 7, wherein the other one of the first current path and the second current path does not include a switch.

9. The sensor integrated circuit according to claim 2, wherein the output control circuit is configured to control, based on the polarity of the alternate current power supply and the magnetic field detection signal, the sensor integrated circuit to switch at least between a first state in which a current flows from the output port to the outside of the sensor integrated circuit and a second state in which a current flows from the outside of the sensor integrated circuit to the output port.

10. The sensor integrated circuit according to claim 9, wherein the external power supply is an alternate current power supply, and the output control circuit is configured to control the sensor integrated circuit to:

operate in one of the first state and the second state in a case that the magnetic field detection signal indicates that the external magnetic field is in first magnetic polarity and the alternate current power supply is in first electric polarity; and operate in the other one of the first state and the second state in a case that the magnetic field detection signal indicates that the external magnetic field is in second magnetic polarity opposite to the first magnetic polarity and the alternate current power supply is in second electric polarity opposite to the first electric polarity.

11. The sensor integrated circuit according to claim 2, wherein the output control circuit is configured to:

cause a load current flowing through the output port in a case that the alternate current power supply is in the positive half-period and the external magnetic field is in first magnetic polarity or in a case that the alternate current power supply is in the negative half-period and the external magnetic field is in second magnetic polarity opposite to the first magnetic polarity; and cause no load current flowing through the output port in a case that the alternate current power supply is in the negative half-period and the external magnetic field is in the first magnetic polarity or in a case that the alternate current power supply is in the positive half-period and the external magnetic field is in the second magnetic polarity.

12. A motor component comprising a motor and a motor driving circuit, wherein the motor driving circuit comprises the sensor integrated circuit according to claim 1.

13. The motor component according to claim 12, wherein the motor driving circuit further comprises a bidirectional switch connected in series to the motor across an external alternate current power supply, and the output port of the sensor integrated circuit is connected to a control terminal of the bidirectional switch.

14. The motor component according to claim 12, wherein the motor comprises a stator and a permanent magnet rotor, and the stator comprises a stator core and a single-phase winding wound on the stator core.

15. An application device of a motor component, wherein the motor component comprises a motor and a motor driving circuit, and the motor driving circuit comprises the sensor integrated circuit according to claim 1.

16. The application device according to claim 15, wherein the application device comprises a pump, a fan, a household electric appliance, and a vehicle.

* * * * *